Dec. 30, 1969 S. ENGELSTEIN 3,486,259

COLOR-CODED FILECARDS

Filed July 7, 1967

INVENTOR.
STANLEY ENGELSTEIN
BY Michael Ebert
ATTORNEY 3,486,259
COLOR-CODED FILECARDS
Stanley Engelstein, New York, N.Y., assignor, by mesne assignments, to Bellhow Jackets Inc., a corporation of Delaware
Filed July 7, 1967, Ser. No. 651,842
Int. Cl. G09f 11/30
U.S. Cl. 40—78.15 2 Claims

ABSTRACT OF THE DISCLOSURE

A filing system wherein the file cards are color-coded to effect classification of the cards into distinct groups. Each file card, in addition to a colored band identifying its group membership, has a notch therein so positioned as to facilitate error detection and removal in the event the card is misfiled.

This invention relates generally to card filing systems, and more particularly to a system composed of filecards or the like which are color-coded and notched to facilitate indexing or classification as well as error detection.

In any filing system made of data cards or equivalent elements, such as microfilm jackets, some means must be provided to divide the cards into groups or categories. The simplest classification system is alpha-numerical, each group being established by a particular letter of the alphabet or by a specific number. Another common expedient is the use of differently positioned notches or tabs to indicate the various classes. One may also classify cards by color-coding.

The use of color-coding is a convenient and highly effective means of classifying cards, for if one class in the filing system is represented, say, by the color red, and another by the color green, a file clerk is not likely to confuse these distinctly colored cards and to place a red card in a green-colored class. On the other hand, not all clerks exercise even ordinary care at all times, and it is not unusual for a clerk to place a green card in the red-colored class. When the cards in a common class or group are closely stacked, the presence of one green card in a red group is difficult to single out. And even if the misfied card is detected, it is difficult to withdraw this card from a tightly stacked set of cards.

This problem becomes more acute when in an elaborate filing system, a broad color spectrum is used wherein some colors are closely related and not readily distinguishable from each other. This confusion is unavoidable, for there are only a few primary colors and many intermediates shades. In a system requiring a large number of classes, it is necessary to employ a wide range of class-identifying colors. In this situation, some of the colors may be closely related or confusingly similar.

Thus, indigo and blue are not sharply distinct, yellow is visually very close to buff, and red and salmon cannot always be told apart. If, therefore, a buff-colored card is misfiled in a stack of yellow cards, it is very hard to pick out.

Accordingly, the main object of this invention is to provide a classification system for file cards, in which the cards are color-coded to establish different groups and in which the cards are selectively notched to facilitate the detection of filing errors.

A significant feature of the invention resides in the fact that when a card is misfiled, its colored marginal band extends across a channel formed by the aligned notches of the correctly filed cards in the group, thereby giving an immediate error indication and making it possible to pull out the misfiled card by its color band. Thus a positive error indicator is provided which can even be detected in the dark or blindfolded, by touch, for the misfiled card stands out.

More specifically, it is an object of the invention to provide a filing system in which the cards are constituted by microfilm jackets having indexing strips which incorporate both the colors and the notches for classification and error detection.

Also an object of the invention is to provide a filing system in which the cards have more than one notch to establish both classes and sub-classes.

Still another object of the invention is to provide a filing classification system which is simple and inexpensive, and yet efficient and reliable in operation.

Briefly stated, these objects are attained in a classified filing system wherein each file card is provided at its top border with a white or neutral indexing strip whose upper margin has a colored band, filing groups being established within the system by having all cards belonging to a particular group with a band of a distinct color and with a notch in the band which exposes the white edge of the strip, the notch occupying a selected position along the border, whereby the group membership of any card is made evident by its color and its notch position, so that when cards, all of which belong to a given group, are stacked, the notches thereof are aligned to define a clear channel whose bed is formed by the exposed white edges of the strips, but when a card belonging to another group is misfiled in said given group, its color band obstructs said clear channel, this fact being highlighted by contrast with the white bed, to facilitate error detection and removal.

For a better understanding of the invention as well as other objects and further features thereof, reference is made to the following detailed description to be read in conjunction with the accompanying drawing, wherein.

Figures 1, 2, 3, 4:
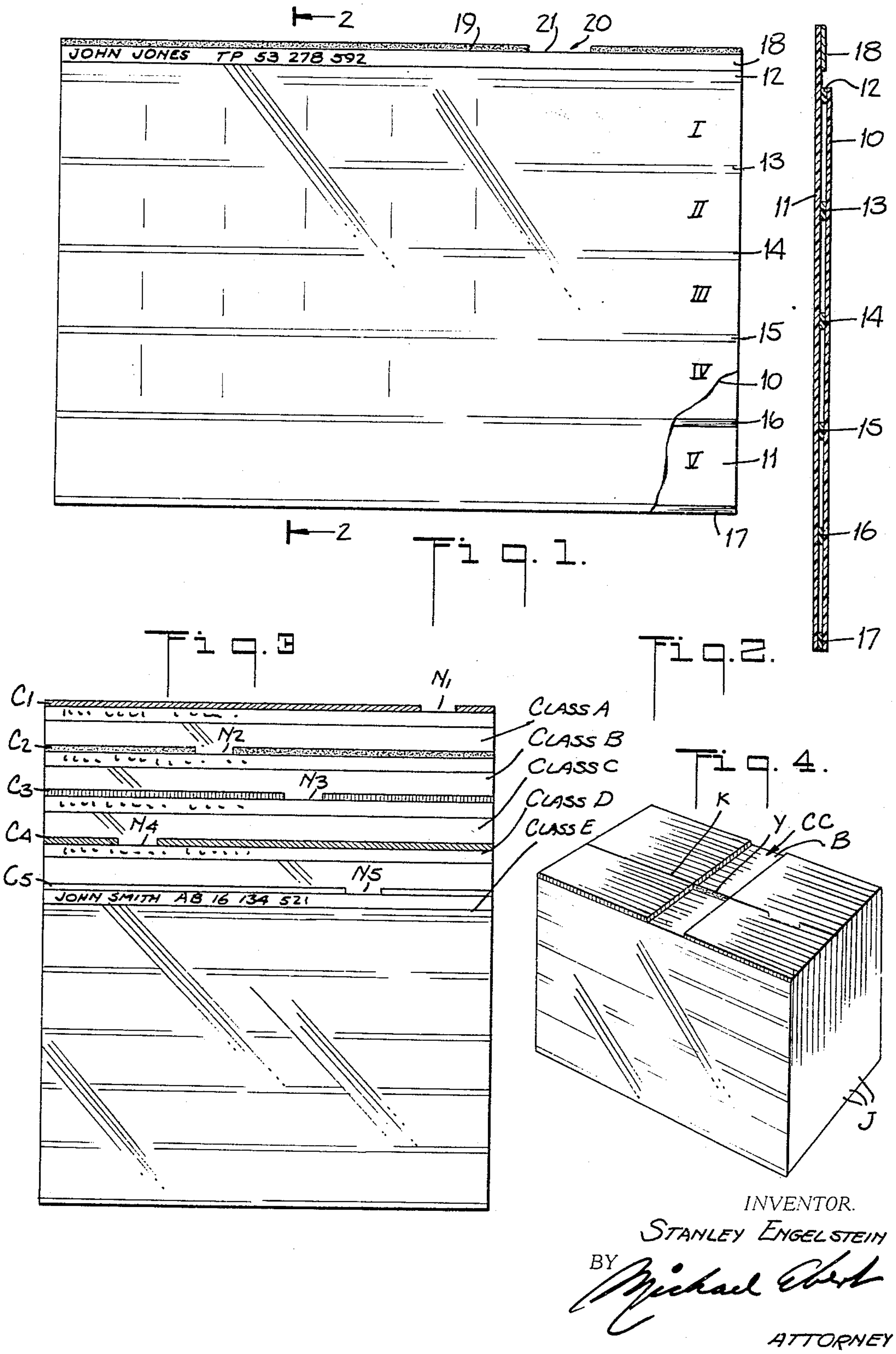
FIG. 1 is a front view of a color-coded microfilm jacket according to the invention.
FIG. 2 is a transverse section taken through the jacket in the plane indicated by line 2—2 of FIG. 1.
FIG. 3 shows five different color-coded jackets in overlapping relationship to illustrate the color-coding and notching concept underlying the invention.
FIG. 4 shows, in perspective, a jacket misfiled in a group of jackets having a common color.

Referring now to FIG. 1, there is shown a microfilm jacket in accordance with the invention, for receiving microfilm strips, the jacket comprising two rectangular panels 10 and 11 in superposed relation, the panels being formed of clear, flexible plastic material, such as cellulose acetate, Mylar, or any other suitable sheeting. Interposed between the two panels and adhesively secured thereto are plastic or paper ribs formed by longitudinally-extending ribbons 12 to 17 in parallel relation to define parallel channels I to IV, open at either end. The channels are of like width to accommodate microfilm strips which represent the records to be filed.

The bottom panel 11 is slightly wider than top panel 10 to form an upper border over which an indexing strip 18 is adhesively applied. This strip, which may be of white paper or of a neutral color, is provided at its upper margin with a narrow color band 19, the color of which serves to identify the group or class membership of the card. At a selected position along color band 19, a rectangular notch 20 is formed which cuts through the underlying paper and the plastic panel, the position of the notch along the border being so selected that each color in the system is coordinated with a different notch position. It is important to note that the notch, which cuts out a portion of the color band, thereby exposes the white or neutral edge 21 of the strip.

Thus, as shown in FIG. 3, in which five jackets or cards are provided for five different filing classes or groups A to E, the strip on each card has a different color band $C_1$, $C_2$, $C_3$, $C_4$ and $C_5$, and the band on each card has a notch $N_1$, $N_2$, $N_3$, $N_4$, $N_5$, which is differently positioned on each card, so that cards of the same color have their notches in registration, and cards of different color have their notches out of registration.

The manner in which the notches afford an immediate indication of error will be discussed in connection with FIG. 4, which shows a group of jackets J in a common class represented by a single color; say, a band X which is blue. The jackets are closely stacked, as in a file box. Consequently, all of the notches of jackets J lie in registration, thereby forming a clear channel CC extending across the top of the jackets. Since the white or neutral edges of the strips are exposed by these notches, the horizontal bed B of the channel is white or neutral in appearance. If now a clerk misfiles a single jacket K in the group of jackets J, and jacket K has a band Y with, say, an indigo color, this color would ordinarily be hard to distinguish from the prevailing blue of the jackets J.

However, the notch in jacket K (indicated in dotted lines) is not in line with clear channel CC, but is displaced therefrom and hence hidden by the adjacent jackets J. As a consequence, a portion of the indigo band Y lies athwart channel CC, thereby obstructing the channel. This fact is distinctly visible, for the indigo color of the misfiled band is displayed against the white or neutral color of the channel bed and is therefore highly conspicuous. Thus a casual glance at a group of cards will reveal whether all cards are properly filed therein, or whether one or more cards are misfiled.

To remove a misfiled card, one has simply to lift it by its exposed band portion. Thus the notches serve not only to facilitate error detection, but also to expedite removal of an improperly filed card or jacket.

It will be evident that while the system has been disclosed with microfilm jackets, the same coordinated color and notch principle is applicable to other forms of filing elements, such as simple cardboard cards, envelopes or sheets.

The white indexing strip on which the color band is printed or otherwise impressed, is used for specifically identifying the card within a given group. If, for example, blue cards represent students in a university who are of American origin, red cards, students from Great Britain, and yellow cards, students from France, the names of the American students will be typed on the strips of cards having the blue band, and so on. Thus in the filing system, within the blue group, the cards will be placed in the alphabetical order of the names, as will also be the case in the red and yellow groups. A misfiled card can thereafter be readily detected and restored quickly to its proper file position.

In more complex filing systems, it is necessary to establish sub-classes as well as classes or groups. This can be done by supplying each card with a distinct color and with two or more notches, one giving the main class and the other the sub-class. If, in the example given previously, the break-down of students in the filing system is not merely as to country of origin but also as to class status, viz., freshman, sophomore, junior or senior, then the blue card will indicate an American student, one notch will provide an error indicator for American students, and a second and differently positioned notch will indicate class status. Hence, if a blue card belonging in the sophomore year class is filed with the blue cards (American students) for the freshman year, the first notch will be in channel alignment, but the second notch will be out of alignment, indicating an error. It is also possible to use more than one color in the band to further define classes and sub-classes.

What I claim is:

1. A classified filing system comprising a plurality of like file card elements, each element having an index strip formed of a neutral color extending across a border thereof and a color band extending fully across the margin of said strip, the elements being divided into different classes which are identified by distinct band colors, said bands each having a rectangular notch therein whose position along the border is coordinated with the color thereof, whereby stacked elements belonging to a given class have their notches in registration to expose the neutral edge of said strips to define a clear channel having a neutral bed while the stacked elements belonging to different classes have their notches out of registration, and an element misfiled in said given class has a portion of its color band obstructing said channel, this fact being highlighted by contrast with said neutral bed thereby facilitating error detection, each of said elements being constituted by a microfilm jacket formed by two superposed panels interconnected by parallel ribs to define chambers for receiving microfilm, the back panel being extended to provide a border onto which said index strip is attached.

2. A system as set forth in claim 1, wherein said strips are formed of white paper, whereby the notches in a common class expose the white edge of said paper strips to produce a clear channel having a white bed.

References Cited

UNITED STATES PATENTS

| | | | |
|---|---|---|---|
| 1,099,663 | 6/1914 | Nyvall | 129—16.5 |
| 1,305,318 | 6/1919 | Templeton | 129—16.5 |
| 1,643,161 | 9/1927 | Hemphill | 129—16.5 |
| 1,929,383 | 10/1933 | Barker | 129—16.5 |
| 2,306,412 | 12/1942 | Seifert | 129—16.5 X |
| 3,238,655 | 3/1966 | Engelstein | 40—159 |

FOREIGN PATENTS

| | | |
|---|---|---|
| 1,063,713 | 12/1953 | France. |
| 311,635 | 10/1933 | Italy. |

JEROME SCHNALL, Primary Examiner